(12) United States Patent
Mittermair et al.

(10) Patent No.: US 8,366,498 B2
(45) Date of Patent: Feb. 5, 2013

(54) POWER JACK FOR A WELDING DEVICE

(75) Inventors: Micha Mittermair, Pettenbach (AT); Wolfgang Brunmayr, Wels (AT); Stefan Glanseck, Marchtrenk (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 13/138,114

(22) PCT Filed: Jan. 18, 2010

(86) PCT No.: PCT/AT2010/000014
§ 371 (c)(1),
(2), (4) Date: Jul. 8, 2011

(87) PCT Pub. No.: WO2010/088707
PCT Pub. Date: Aug. 12, 2010

(65) Prior Publication Data
US 2011/0287654 A1    Nov. 24, 2011

(30) Foreign Application Priority Data

Feb. 6, 2009 (AT) .................................. A 208/2009

(51) Int. Cl.
*H01R 13/33* (2006.01)
(52) U.S. Cl. .................................. 439/840; 439/337
(58) Field of Classification Search ............. 439/840, 439/846, 843, 349, 337
See application file for complete search history.

(56) References Cited

U.S. PATENT DOCUMENTS

| 1,935,061 | A | * | 11/1933 | Richards | 439/732 |
| 2,851,670 | A | * | 9/1958 | Senior | 439/825 |
| 2,952,830 | A | * | 9/1960 | Sperzel et al. | 439/338 |
| 3,143,384 | A | * | 8/1964 | Senior, Jr. | 439/282 |
| 3,689,866 | A | * | 9/1972 | Kelly | 439/586 |
| 4,702,539 | A | * | 10/1987 | Cusick et al. | 439/588 |

(Continued)

FOREIGN PATENT DOCUMENTS

| DE | 76 41 025 | 4/1977 |
| DE | 83 04 593 | 5/1983 |
| DE | 43 25 289 | 4/1995 |
| EP | 0 757 201 | 2/1997 |

OTHER PUBLICATIONS

International Search Report of PCT/AT2010/000014, Apr. 20, 2010.

(Continued)

*Primary Examiner* — Phuong Dinh
(74) *Attorney, Agent, or Firm* — Collard & Roe, P.C.

(57) ABSTRACT

The invention relates to a power jack (27) for a welding device (1), in particular an electrode and/or TIG welding device, wherein the power jack (27) made of conductive material comprises a bore (28) for receiving a plug element (29) attached to a hose packet, and an axial guide groove (33) is disposed in the bore (28), the guide groove being guided to the outside by way of a longitudinal groove (34) such that a locating pin (35) disposed on the plug element (29) can be inserted and rotated, wherein in the bore (28) a radial groove (36) is disposed and a retaining element (38) is positioned, preferably in the intersecting region of the groove (36) and the longitudinal groove (34), and a spring element (40) designed to transmit power is disposed in the groove (36), the spring element (40) protruding from the groove (36) and thereby reducing the diameter of the bore (28), wherein the retaining element (38) forms a contact surface (41) for the ends of the spring element (40) which is configured over only part of the entire periphery.

4 Claims, 5 Drawing Sheets

U.S. PATENT DOCUMENTS

| | | | |
|---|---|---|---|
| 4,810,213 A | | 3/1989 | Chabot |
| 5,980,334 A | * | 11/1999 | Pyles .......................... 439/764 |
| 6,053,756 A | * | 4/2000 | Flanigan et al. ............. 439/315 |
| 7,377,825 B2 | * | 5/2008 | Bankstahl ..................... 439/889 |
| 2003/0096526 A1 | | 5/2003 | Balsells |
| 2008/0254670 A1 | | 10/2008 | Balsells et al. |

OTHER PUBLICATIONS

Austrian Office Action dated Oct. 23, 2009 in Austrian Application No. A 208/2009 with English translation of the relevant parts.

* cited by examiner

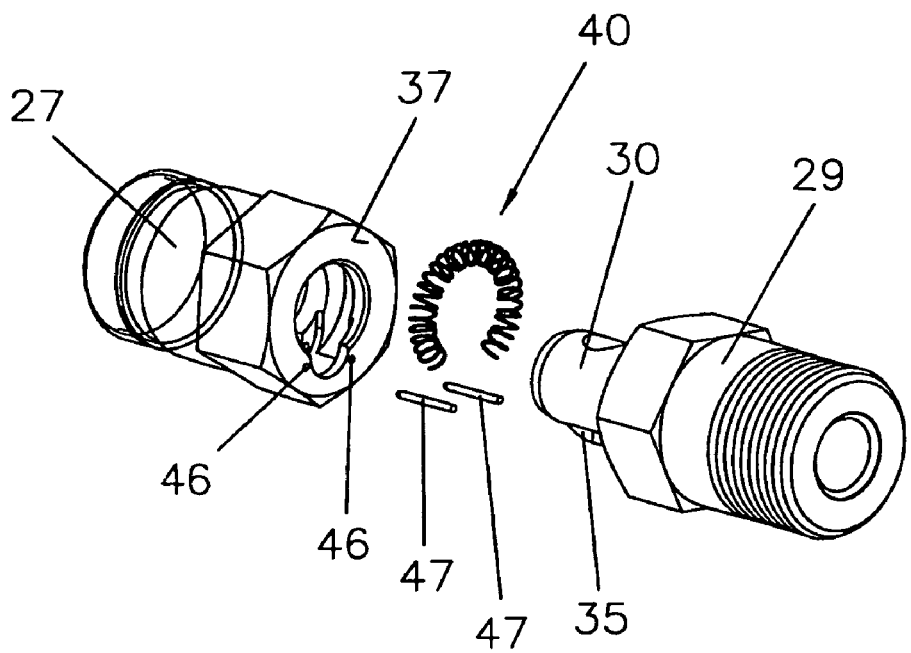
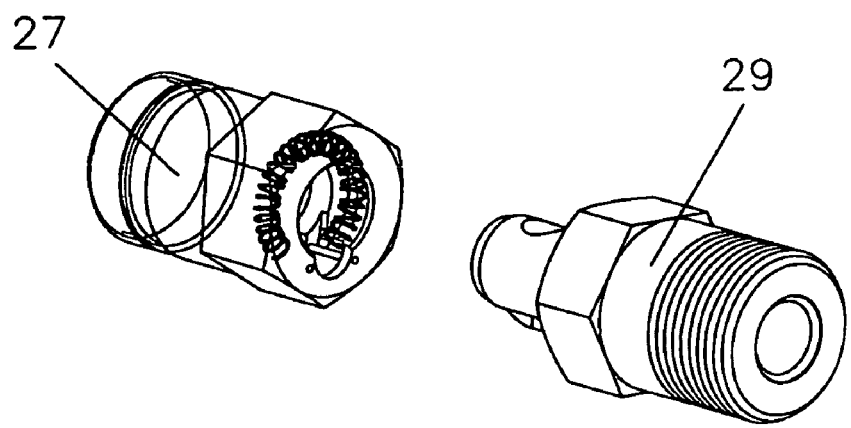
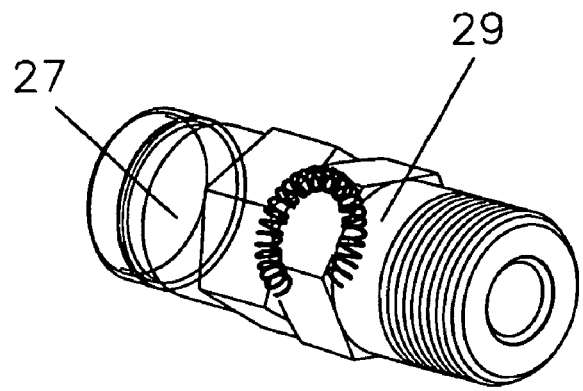
Fig.5

POWER JACK FOR A WELDING DEVICE

CROSS REFERENCE TO RELATED APPLICATIONS

This application is the National Stage of PCT/AT2010/000014 filed on Jan. 18, 2010, which claims priority under 35 U.S.C. §119 of Austrian Application No. A 208/2009 filed on Feb. 6, 2009, the disclosure of which is incorporated by reference. The international application under PCT article 21(2) was not published in English.

The invention relates to a power jack for a welding device, in particular an electrode and/or TIG welding device, wherein the power jack, which is made of conductive material, includes a bore for receiving a plug element attached to a hose pack, and an axial guide groove is disposed in the bore, said guide groove being guided towards outside via a longitudinal groove such that a guide pin disposed on the plug element can be inserted and rotated.

From DE 76 41 025 U, a plug-in connection, particularly for a welding cable, is known, which is comprised of a jack part and a plug part, which are connected with each other by rotation. Furthermore, they are protected by insulating sleeves. A positive-locking connection preventing rotation is provided between the insulating sleeve and the associated jack part or plug part, respectively. The positive-locking connection is formed by a tongue and groove connection extending in the longitudinal or plug-in direction.

From DE 83 04 593 U, a unipolar electric welding-cable coupling is, moreover, known, whose plug and jack bodies are coaxially arranged and lockable by telescoping and counter-rotating by the engagement of a retaining pin of the plug body with a rising annular groove of the jack body. A supply line is conducted centrally through the plug and jack bodies. The supply line is a protective-gas or coolant line, and an annular seal abutting on the end face of the plug body is arranged in the jack body.

Those known couplings according to DE 76 41 025 and DE 83 04 593 U involve the drawback that the bayonet connection may come loose and consequently provide poor contact, whereby an increased transfer resistance will cause heating and, in the worst case, burning of the plug-in connection. This is due to the fact that welders on a construction site frequently pull on the hose pack such that the bayonet connection may come loose and cause the plug with the pin to be only loosely plugged in the opening.

From DE 43 25 289 A1, a welding cable connection is known in which a jack and contact-pin connection rotatably and safely connects the welding cable in the handle of an electric arc welding and cutting torch or on the machine side of an electric arc automatic welding and cutting torch. The rotatability is ensured by the arrangement of a spring basket in the contact area of the jack. When connecting the contact pin with the jack, the contact area of the contact pin is clamped into the spring basket and secured against possible extraction by the aid of a clamping spring that engages with an annular groove provided on the contact pin. The stop arranged on the jack delimits the rotatability of the welding cable in cooperation with the guide pin arranged on the contact pin, thus protecting the control lines.

From BALSEAL Engineering, a contact system named "BalContact" is known, in which a groove with an inserted spring element is disposed in an opening of the power jack for improved contacting and power transmission. The spring element in that case has a smaller inner diameter than the opening, thus causing the spring element to project out of the groove. When a plug contact having a slightly smaller outer diameter than the inner diameter of the opening is inserted into the opening, the spirals of the spring element are being deformed. By using the spring element, several contact points are formed, providing an enhanced conductivity. The individual bending of each spiral of the spring element ensures the simple compensation of contact and surface variations on the plug contact.

This involves the drawback of only circular or round spring elements being offered, thus rendering impossible its use in not completely round openings. If the circular structure were in fact interrupted, i.e. separated, the spring element would lose its inherent stiffness and, when inserted in a groove, would fall out of the same.

The object of the invention resides in providing a power jack that ensures safe contacting even with an incorrectly plugged-in plug.

This object is achieved in that, in the bore, a radial groove is disposed and a retaining element is positioned, preferably in the intersecting region of the groove and the longitudinal groove, and that a spring element designed to transmit power, in particular a spiral spring, is disposed in the groove, said spring element protruding from the groove and thereby reducing the diameter of the bore, wherein the retaining element forms a stop surface for the ends of the spring element formed over only a part of the entire periphery.

It is advantageous that a safe seat or safe contacting of the plug element is achieved by the use of a spring element. Due to the high currents occurring during welding, it will frequently happen that the plug element will not be correctly positioned in the bore of the power jack, thus resulting in an elevated transfer resistance and overheating, and hence causing the power jack and the plug element to burn down. By using the spring element, a plurality of contact points will, however, be formed on the nose of the plug element on account of, e.g., the turns or spirals of the spring such that a very good power transfer will always be provided and no overheating will thus occur. A further advantage also resides in that, due to the use of the spring element, the bayonet connection need not be locked while a safe power transfer will nevertheless be provided. It is thus safeguarded that a safe power transfer is ensured in any position. It is, moreover, prevented that a poor contact is provided when the bayonet connection is loosened by pulling on the hose pack, which may cause overheating and, consequently, the burning-down of the plug-in connection.

Other advantageous embodiments and further developments are defined in the subclaims. Advantages resulting therefrom can be taken from the description.

The present invention will be explained in more detail by way of the annexed, schematic drawings. Therein:

FIG. 5 is a schematic illustration of yet another exemplary embodiment of a power jack comprising pin bores for pins, from individual parts to the assembled state, in a simplified representation.

FIG. 1 depicts a welding apparatus 1, or welding installation, for various processes or methods such as, e.g., MIG/MAG welding or TIG welding, or electrode welding methods, double-wire/tandem welding methods, plasma or soldering methods etc.

Figure 1:
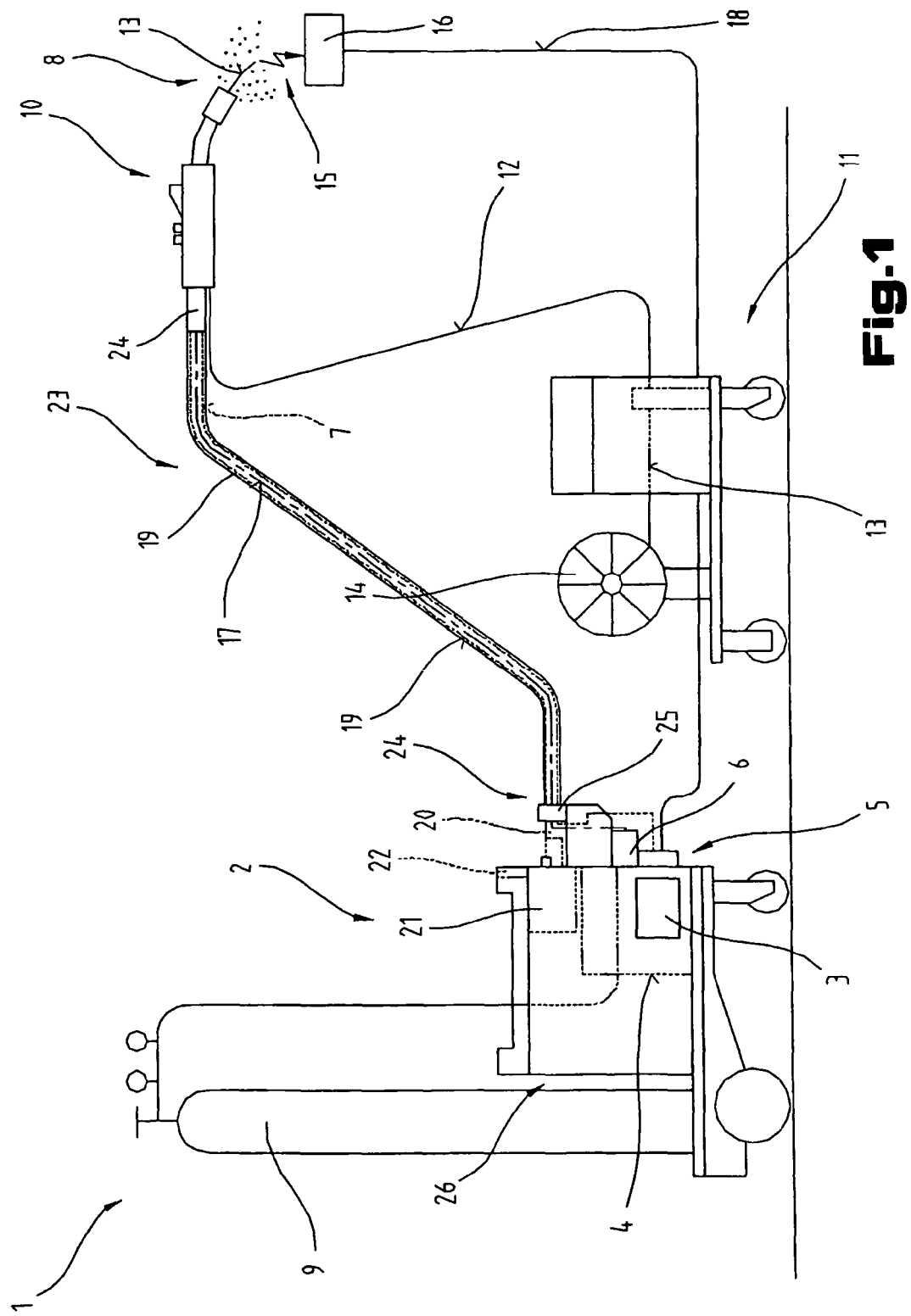
FIG. 1 is a schematic illustration of a welding machine or welding apparatus.

The welding apparatus 1 comprises a power source 2 including a power element 3, a control device 4, and a switch member 5 associated with the power element 3 and control device 4, respectively. The switch member 5 and the control device 4 are connected with a control valve 6 arranged in a feed line 7 for a gas 8, in particular a protective gas such as, for instance, carbon dioxide, helium or argon and the like, between a gas reservoir 9 and a welding torch 10 or torch.

In addition, a wire feeder 11, which is usually employed in MIG/MAG welding, can be activated by the control device 4, wherein a filler material or welding wire 13 is fed from a wire storage or storage drum 14, such as a wire coil or wire drum, into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1.

It is also possible for the wire feeder 11 to supply the welding wire 13, or filler metal, to the process site outside the welding torch 10, to which end a non-consumable electrode is preferably arranged within the welding torch 10, as is usually the case with TIG welding.

The power required for building up an electric arc 15, in particular an operative electric arc, between the electrode or the the welding wired, not illustrated, and a workpiece 16 is supplied from the power element 3 of the power source 2 to the welding torch 10, in particular electrode, via a welding line 17, wherein the workpiece 16 to be welded, which is preferably comprised of several parts, via a further welding line 18 is likewise connected with the welding apparatus 1 and, in particular, power source 2 so as to enable a power circuit for a process to build up over the electric arc 15, or the plasma jet formed.

For cooling the welding torch 10, the welding torch 10 can be connected to a fluid reservoir, in particular water reservoir 21, by a cooling circuit 19 via an interposed flow control 20 so as to start the cooling circuit 19, in particular a fluid pump used for the fluid contained in the water reservoir 21, when the welding torch 10 is put into operation, and hence effect cooling of the welding torch 10.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which will subsequently activate the individual components of the welding apparatus 1 and/or preset the respective values required for controlling.

In the exemplary embodiment illustrated, the welding torch 10 is further connected with the welding apparatus 1 or welding installation via a hose pack 23. The hose pack 23 houses the individual lines from the welding apparatus 1 to the welding torch 10. The hose pack 23 is connected with the welding torch 10 via a coupling mechanism 24, whereas the individual lines arranged within the hose pack 23 are connected with the individual contacts of the welding apparatus 1 via connection sockets or plug-in connections. In order to ensure the appropriate strain relief of the hose pack 23, the hose pack 23 is connected with a housing 26, in particular the basic housing of the welding apparatus 1, via a strain relief means 25. It is, of course, possible to use the coupling mechanism 24 also for connection to the welding apparatus 1.

It should basically be noted that not all of the previously mentioned components need to be used or employed for the different welding methods or welding apparatus 1 such as, e.g., TIG devices or MIG/MAG apparatus or plasma devices. Thus, it is, for instance, possible to devise the welding torch 10 as an air-cooled welding torch 10.

Figure 2:
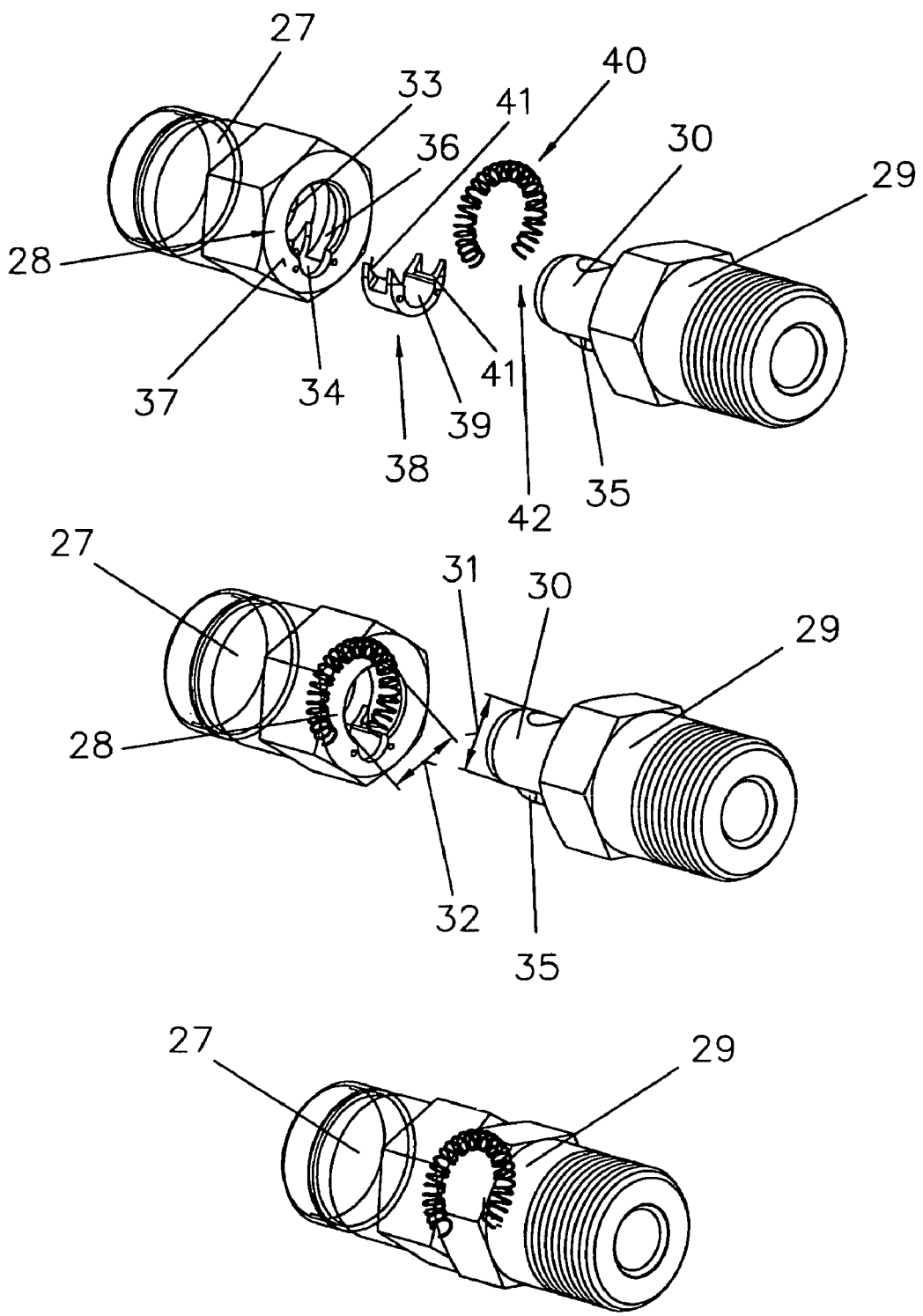
FIG. 2 is a schematic illustration of an exemplary embodiment of a power jack comprising a retaining element, from the individual parts to the assembled state, in a simplified representation.

In FIG. 2, a detailed solution of the connection jacks or plug-in connections, in particular a power jack 27, for connecting the line, in particular welding lines 17, 18, for the welding torch 10 is illustrated and described.

What is essential with the novel power jack 27 is that a safe contact is ensured in the power jack 27, since very high currents are required for welding operations and a safe power transfer has thus have to be provided. In a preferred manner, the power jack 27 is used in an electrode and/or TIG welder.

The power jack 27 is preferably made of a conductive material and formed in one part. The power jack comprises a bore 28 for receiving a plug element 29 attached to a hose pack, wherein a nose 30 of the plug element 29 has a slightly smaller outer diameter 31 than an inner diameter 32 of the bore 28 so as to enable the insertion of the nose 30 into the bore 28.

In the bore 28 is provided an axially extending guide groove 33 which, via a depression, i.e. a longitudinal groove 34, is guided outwards so as to enable a guide pin 35 disposed on the plug element 29, in particular on the nose 30, to be inserted along the depression or longitudinal groove 34 and subsequently rotated into the guide groove 33 for fixing the plug element 29. The diameter of the guide groove 33 preferably changes continuously such that the guide pin 35 will be clamped within the guide groove 33 by suitable rotation and a fixation of the plug element 29 will thus be reached.

With the power jack 27 for a welding device 1, it is, in particular, provided that a radial groove 36 is arranged in the bore 28. This groove 36 is preferably provided between the front side 37 of the power jack 27 and the guide groove 33 for the guide pin 35, thus intersecting with the depression or longitudinal groove 34. In the region of intersection of the groove 36 and the longitudinal groove 34, a retaining element 38 is positioned, said retaining element 38 being designed in a manner comprising a depression 39 such that the longitudinal groove 34 or depression will not be interrupted. Furthermore, a spring element 40, in particular a helical or spiral spring, is disposed in the groove 36, said retaining element 38 forming a stop surface 41 for the ends 42 of the spring element 40. The spring element 40 is designed to transmit power.

In order to provide an improved power transfer, the groove 36 is configured such that the spring element 40 projects out of the groove 36. The inner diameter 32 of the power jack 27 and, in particular the bore 28 is thus reduced by the projecting turn parts of the spring element 40. As the plug element 29 with the guide pin 35 is introduced into the power jack 27, the individual turns of the spring element 40 are being deformed, thus providing a safe power transfer from the power jack 27 to the nose 30 of the plug element 29. Due to the special configuration of the retaining element 38 in the region of intersection, it has become possible for the guide pin 35 provided on the nose 30 to be passed through the longitudinal groove 34 and the retaining element 38, and subsequently be fixed in the guide groove 33 by rotating the guide pin 35.

Figure 3:
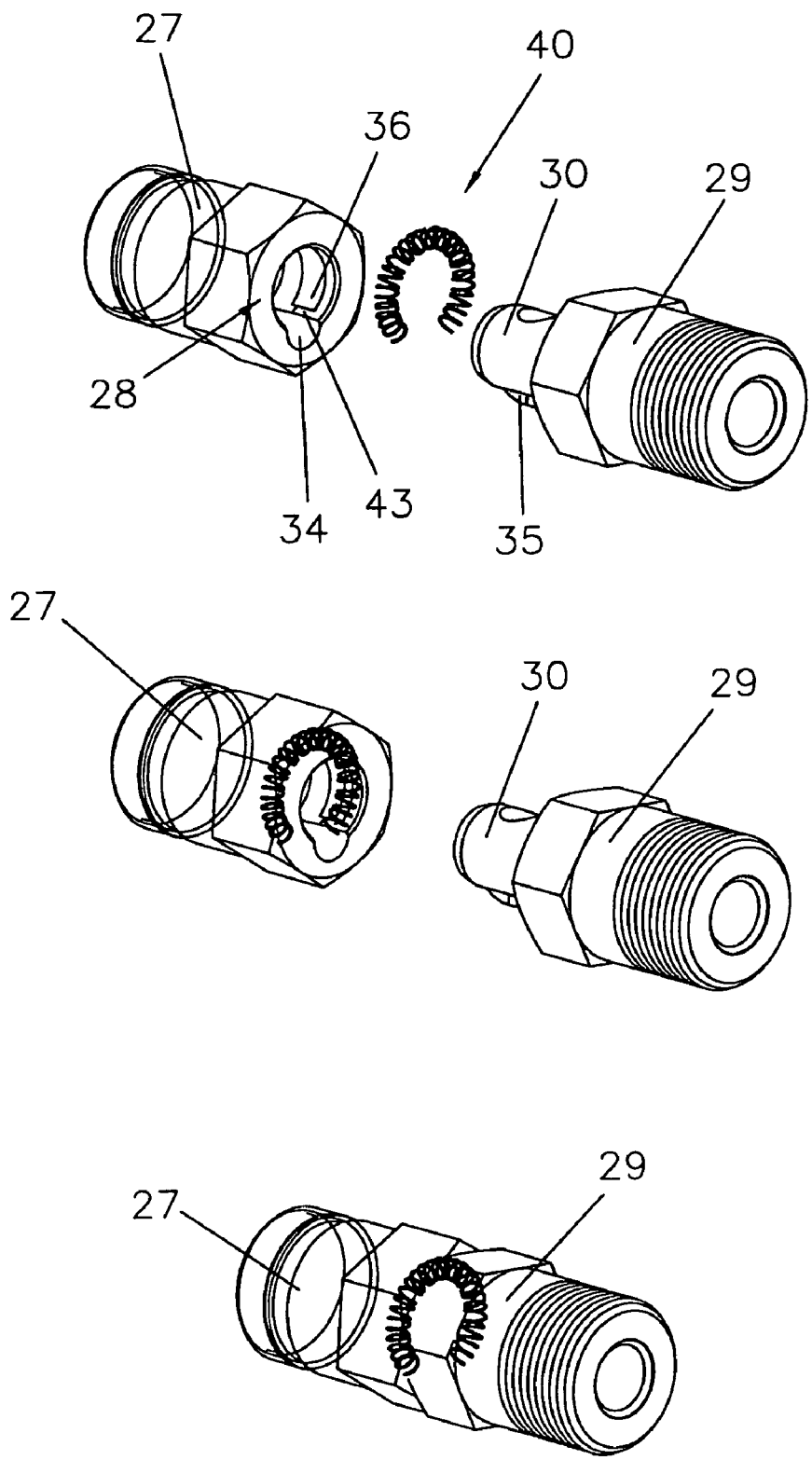
FIG. 3 is a schematic illustration of a further exemplary embodiment of a power jack comprising a web as a stop surface, from the individual parts to the assembled state, in a simplified representation.

As is apparent from FIG. 3, it is further possible to provide a power jack 27 configuration in which the retaining element 38 described in FIG. 2 and inserted or installed is no longer used. In this case, the groove 36 for the spring element 40 is not provided over the entire periphery, but a web 43 is formed between the longitudinal groove 34 and the groove 36, so that the spring element 40 is supported on the web 43 and a safe retention of the spring element 40 in the bore 28 of the power jack 27 will thus again be ensured.

Figure 4:
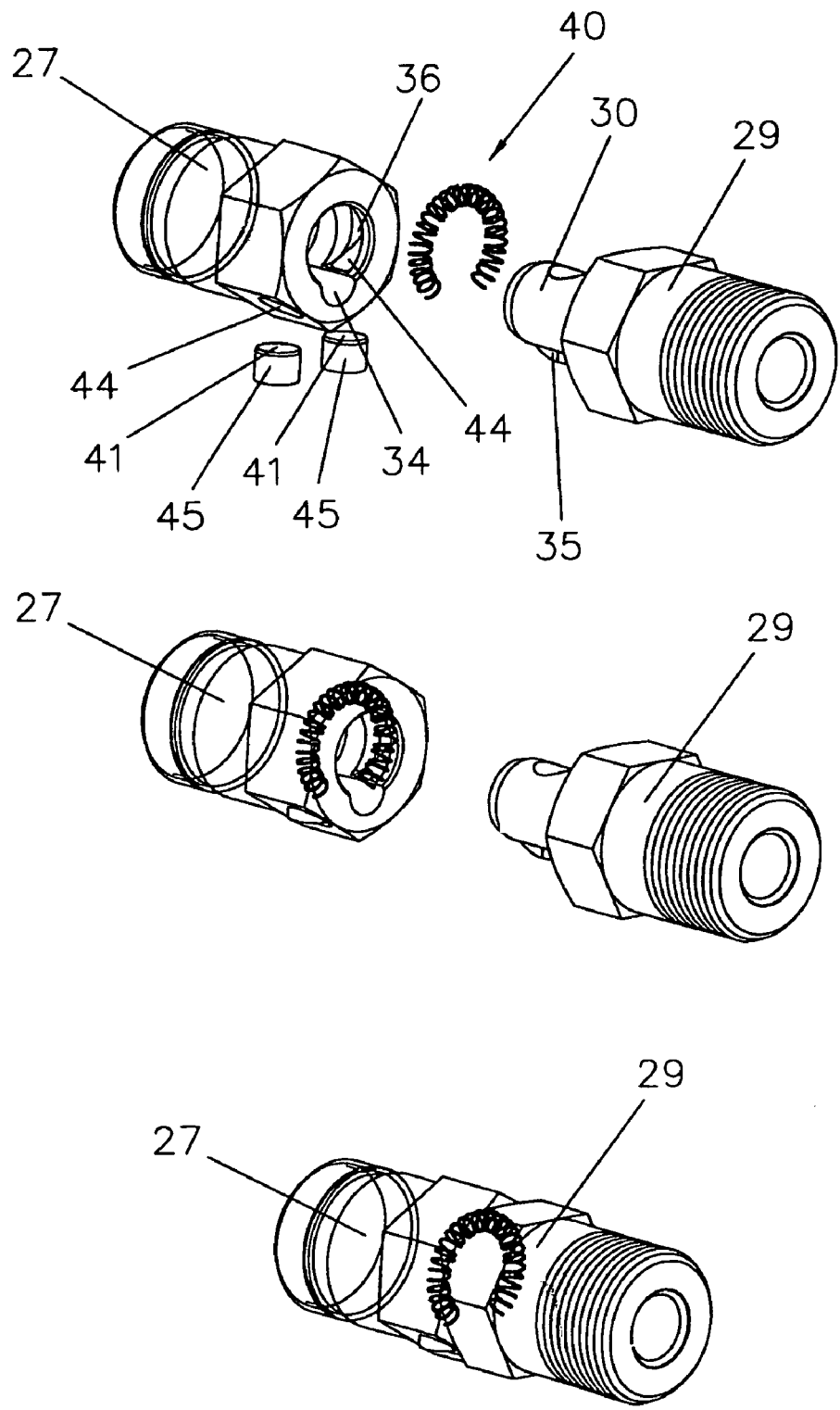
FIG. 4 is a schematic illustration of a further exemplary embodiment of a power jack comprising bores for stop elements, from the individual parts to the assembled state, in a simplified representation.

A safe retention of the spring element 40 in the bore 28 of the power jack 27 is also achieved in the further exemplary embodiment according to FIG. 4. In this case, the power jack 27 comprises two bores 44 extending in the groove 36 for the spring element 40. By inserting stop elements 45 into the bores 44, it will be achieved that a stop surface 41 for the spring element 40 will again be provided in the groove 36 for the spring elements 40 so as to enable the retention of the spring element 40 in the groove 36. In this case, it is also possible to provide the bore 44 with a thread such that the stop element 45 can be simply screwed into the bore 44 from outside.

In the embodiment according to FIG. 5, a safe retention of the spring element 40 is again achieved, to which end pin bores 46 departing from the end face 37 of the power jack 27 are provided in parallel with the longitudinal groove 34 on each side, into which a pin 47 can then each be respectively inserted. These pin bores 46, and the pins 47, intersect with the groove 36 for the spring element 40 so as to form a stop surface 41 for the spring element 40 by inserting the pins 47.

The invention claimed is:

1. A power jack (27) for a welding device (1), in particular an electrode and/or TIG welding device, wherein the power jack (27), which is made of conductive material, includes a bore (28) for receiving a plug element (29) attached to a hose pack, and an axial guide groove (33) is disposed in the bore (28), said guide groove (33) being guided towards outside via a longitudinal groove (34) such that a guide pin (35) disposed on the plug element (29) can be inserted and rotated, wherein, in the bore (28), a radial groove (36) is disposed and a retaining element (38; 43; 45; 47) is positioned, preferably in the intersecting region of the groove (36) and the longitudinal groove (34), and wherein a spring element (40) designed to transmit power, in particular a spiral spring, is disposed in the groove (36), said spring element (40) protruding from the groove (36) and thereby reducing the diameter of the bore (28), wherein the retaining element (38; 43; 45; 47) forms a stop surface (41) for the ends of the spring element (40) formed over only a part of the entire periphery.

2. A power jack (27) according to claim 1, wherein the retaining element (38) is formed by a web (43) disposed between the longitudinal groove (34) and the groove (36) and formed in one piece of the material of the power jack (27).

3. A power jack (27) according to claim 1, wherein two bores (44) extend in the groove (36) for the spring element (40), stop elements (45) being insertable into the bores (44) for providing the stop surface (41) for the spring element (40).

4. A power jack (27) according to claim 1, wherein pin bores (46) departing from the end face of the power jack (27) are provided in parallel with the longitudinal groove (34) on each side, into which a pin (47) can each be inserted.

* * * * *